(12) United States Patent
Nathan (10) Patent No.: US 8,189,819 B2
(45) Date of Patent: May 29, 2012

(54) SOUND CONTROL CIRCUIT FOR A DIGITAL AUDIOVISUAL REPRODUCTION SYSTEM

(75) Inventor: Guy Nathan, Yerres (FR)

(73) Assignee: TouchTunes Music Corporation, New York, NY (US)

( * ) Notice: Subject to any disclaimer, the term of this patent is extended or adjusted under 35 U.S.C. 154(b) by 1198 days.

(21) Appl. No.: 10/965,742

(22) Filed: Oct. 18, 2004

(65) Prior Publication Data

US 2005/0073782 A1    Apr. 7, 2005

Related U.S. Application Data

(63) Continuation of application No. 09/357,758, filed on Jul. 21, 1999, now Pat. No. 6,898,161.

(30) Foreign Application Priority Data

Jul. 22, 1998  (FR) ...................................... 98 09350

(51) Int. Cl.
    *H02B 1/00*    (2006.01)
(52) U.S. Cl. ........................... 381/123; 381/104; 463/35
(58) Field of Classification Search .................. 381/102, 381/104, 107–109, 123; 700/94; 463/35–36, 463/39
    See application file for complete search history.

(56) References Cited

U.S. PATENT DOCUMENTS

| | | |
|---|---|---|
| 3,807,541 A | 4/1974 | Kortenhaus |
| 3,982,620 A | 9/1976 | Kortenhaus |
| 4,008,369 A | 2/1977 | Theurer et al. |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |

(Continued)

FOREIGN PATENT DOCUMENTS

AU    199954012    4/2000

(Continued)

OTHER PUBLICATIONS

"Robotic Wafer Handling System for Class 10 Environments" *IBM Technical Disclosure Bulletin*, vol. 32, No. 9A, Feb. 1990, pp. 141-143.

(Continued)

*Primary Examiner* — Xu Mei
(74) *Attorney, Agent, or Firm* — Nixon & Vanderhye PC (57) ABSTRACT

Sound control circuit comprising a game port, installed on a digital audiovisual reproduction system managed by an operating system, characterized in that the game port in the sound control circuit is used to create an access to the configuration of the audiovisual reproduction system and/or additional management functions for the audiovisual reproduction system.

20 Claims, 3 Drawing Sheets

U.S. PATENT DOCUMENTS

| | | |
|---|---|---|
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust et al. |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimaru |
| 5,077,607 A | 12/1991 | Johnson et al. |
| 5,081,534 A | 1/1992 | Geiger et al. |
| 5,101,499 A | 3/1992 | Streck et al. |
| 5,106,097 A | 4/1992 | Levine |
| 5,117,407 A | 5/1992 | Vogel |
| 5,138,712 A | 8/1992 | Corbin |
| 5,148,159 A | 9/1992 | Clark et al. |
| 5,155,847 A | 10/1992 | Kirouac |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,237,157 A | 8/1993 | Kaplan |
| 5,237,322 A | 8/1993 | Heberle |
| 5,239,480 A | 8/1993 | Huegel |
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Bouton |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |

| | | | | | |
|---|---|---|---|---|---|
| 5,594,509 A | 1/1997 | Florin | 5,835,843 A | 11/1998 | Haddad |
| 5,596,702 A | 1/1997 | Stucka et al. | 5,842,869 A | 12/1998 | McGregor et al. |
| 5,612,581 A | 3/1997 | Kageyama | 5,845,104 A | 12/1998 | Rao |
| 5,613,909 A | 3/1997 | Stelovsky | 5,845,256 A | 12/1998 | Pescitelli et al. |
| 5,616,876 A | 4/1997 | Cluts | 5,848,398 A | 12/1998 | Martin |
| 5,617,565 A | 4/1997 | Augenbraun et al. | 5,851,149 A | 12/1998 | Xidos et al. |
| 5,619,247 A | 4/1997 | Russo | 5,854,887 A | 12/1998 | Kindell |
| 5,619,249 A | 4/1997 | Billock et al. | 5,857,020 A | 1/1999 | Peterson |
| 5,619,250 A | 4/1997 | McClellan et al. | 5,857,707 A | 1/1999 | Devlin |
| 5,619,698 A | 4/1997 | Lillich | 5,862,324 A | 1/1999 | Collins |
| 5,623,666 A | 4/1997 | Pike | 5,864,811 A | 1/1999 | Tran et al. |
| 5,631,693 A | 5/1997 | Wunderlich et al. | 5,864,868 A | 1/1999 | Contois |
| 5,636,276 A | 6/1997 | Brugger | 5,864,870 A | 1/1999 | Guck |
| 5,638,426 A | 6/1997 | Lewis | 5,867,714 A | 2/1999 | Todd |
| 5,642,337 A | 6/1997 | Oskay | 5,870,721 A | 2/1999 | Norris |
| 5,644,714 A | 7/1997 | Kikinis | 5,880,386 A | 3/1999 | Wachi et al. |
| 5,644,766 A | 7/1997 | Coy | 5,880,769 A | 3/1999 | Nemirofsky et al. |
| 5,654,714 A | 8/1997 | Takahashi et al. | 5,884,028 A | 3/1999 | Kindell |
| 5,659,466 A | 8/1997 | Norris et al. | 5,884,298 A | 3/1999 | Smith |
| 5,661,517 A | 8/1997 | Budow et al. | 5,887,193 A | 3/1999 | Takahashi |
| 5,661,802 A | 8/1997 | Nilssen | 5,896,094 A | 4/1999 | Narisada et al. |
| 5,663,756 A | 9/1997 | Blahut et al. | 5,903,266 A * | 5/1999 | Berstis et al. ................. 715/708 |
| 5,668,592 A | 9/1997 | Spaulding | 5,913,040 A | 6/1999 | Rakavy |
| 5,668,778 A | 9/1997 | Quazi | 5,914,712 A | 6/1999 | Sartain et al. |
| 5,668,788 A | 9/1997 | Allison | 5,915,094 A | 6/1999 | Kouloheris |
| 5,675,734 A | 10/1997 | Hair | 5,915,238 A | 6/1999 | Tjaden |
| 5,680,533 A * | 10/1997 | Yamato et al. ................. 345/473 | 5,917,537 A | 6/1999 | Lightfoot |
| 5,684,716 A | 11/1997 | Freeman | 5,917,835 A | 6/1999 | Barrett |
| 5,689,641 A | 11/1997 | Ludwig et al. | 5,918,213 A | 6/1999 | Bernard et al. |
| 5,691,778 A | 11/1997 | Song | 5,920,700 A | 7/1999 | Gordon et al. |
| 5,691,964 A | 11/1997 | Niederlein et al. | 5,920,702 A | 7/1999 | Johnson |
| 5,696,914 A | 12/1997 | Nahaboo et al. | 5,923,885 A | 7/1999 | Johnson |
| 5,697,844 A | 12/1997 | Von Kohorn | 5,926,531 A | 7/1999 | Petite |
| 5,703,795 A | 12/1997 | Mankovitz | 5,930,765 A | 7/1999 | Martin |
| 5,708,811 A | 1/1998 | Arendt | 5,931,908 A | 8/1999 | Gerba |
| 5,712,976 A | 1/1998 | Falcon | 5,933,090 A | 8/1999 | Christenson |
| 5,713,024 A | 1/1998 | Halladay | 5,940,504 A | 8/1999 | Griswold |
| 5,715,416 A | 2/1998 | Baker | 5,949,411 A | 9/1999 | Doerr et al. |
| 5,717,452 A | 2/1998 | Janin et al. | 5,949,688 A | 9/1999 | Montoya |
| 5,721,583 A | 2/1998 | Harada et al. | 5,953,429 A | 9/1999 | Wakai et al. |
| 5,721,815 A | 2/1998 | Ottesen et al. | 5,956,716 A | 9/1999 | Kenner et al. |
| 5,721,829 A | 2/1998 | Dunn et al. | 5,959,869 A | 9/1999 | Miller |
| 5,724,525 A | 3/1998 | Beyers et al. | 5,959,945 A | 9/1999 | Kleiman |
| 5,726,909 A | 3/1998 | Krikorian | 5,963,916 A | 10/1999 | Kaplan |
| 5,734,719 A | 3/1998 | Tsevdos | 5,966,495 A | 10/1999 | Takahashi |
| 5,734,961 A | 3/1998 | Castille | 5,978,855 A | 11/1999 | Metz |
| 5,739,451 A | 4/1998 | Winksy et al. | 5,978,912 A | 11/1999 | Rakavy et al. |
| 5,743,745 A | 4/1998 | Reintjes | 5,980,261 A | 11/1999 | Mino et al. |
| 5,745,391 A | 4/1998 | Topor | 5,999,499 A | 12/1999 | Pines et al. |
| 5,748,254 A | 5/1998 | Harrison et al. | 5,999,624 A | 12/1999 | Hopkins |
| 5,748,468 A | 5/1998 | Notenboom et al. | 6,002,720 A | 12/1999 | Yurt |
| 5,751,336 A | 5/1998 | Aggarwal et al. | 6,005,599 A | 12/1999 | Asai et al. |
| 5,757,936 A | 5/1998 | Lee | 6,008,735 A | 12/1999 | Chiloyan et al. |
| 5,758,340 A | 5/1998 | Nail | 6,009,274 A | 12/1999 | Fletcher |
| 5,761,655 A | 6/1998 | Hoffman | 6,011,758 A | 1/2000 | Dockes et al. |
| 5,762,552 A | 6/1998 | Vuong | 6,018,337 A | 1/2000 | Peters |
| 5,774,527 A | 6/1998 | Handelman et al. | 6,018,726 A | 1/2000 | Tsumura |
| 5,774,668 A | 6/1998 | Choqiuer | 6,025,868 A | 2/2000 | Russo |
| 5,774,672 A | 6/1998 | Funahashi | 6,034,925 A | 3/2000 | Wehmeyer |
| 5,781,889 A | 7/1998 | Martin et al. | 6,038,591 A | 3/2000 | Wolfe et al. |
| 5,786,784 A | 7/1998 | Gaudichon | 6,040,829 A | 3/2000 | Croy et al. |
| 5,790,172 A | 8/1998 | Imanaka | 6,041,354 A | 3/2000 | Biliris et al. |
| 5,790,671 A | 8/1998 | Cooper | 6,054,987 A | 4/2000 | Richardson |
| 5,790,856 A | 8/1998 | Lillich | 6,055,573 A | 4/2000 | Gardenswartz et al. |
| 5,793,364 A | 8/1998 | Bolanos et al. | 6,057,874 A | 5/2000 | Michaud |
| 5,793,980 A | 8/1998 | Glaser | 6,069,672 A | 5/2000 | Claassen |
| 5,798,785 A | 8/1998 | Hendricks | 6,072,982 A | 6/2000 | Haddad |
| 5,802,283 A | 9/1998 | Grady et al. | 6,107,937 A | 8/2000 | Hamada |
| 5,802,599 A | 9/1998 | Cabrera | 6,118,450 A | 9/2000 | Proehl et al. |
| 5,805,804 A | 9/1998 | Laursen et al. | 6,124,804 A | 9/2000 | Kitao et al. |
| 5,808,224 A | 9/1998 | Kato | 6,131,088 A | 10/2000 | Hill |
| 5,809,246 A | 9/1998 | Goldman | 6,131,121 A | 10/2000 | Mattaway et al. |
| 5,812,643 A | 9/1998 | Schelberg et al. | 6,134,547 A | 10/2000 | Huxley et al. |
| 5,815,146 A | 9/1998 | Youden et al. | 6,138,150 A | 10/2000 | Nichols et al. |
| 5,825,884 A | 10/1998 | Zdepski et al. | 6,148,142 A | 11/2000 | Anderson |
| 5,831,555 A | 11/1998 | Yu et al. | 6,151,077 A | 11/2000 | Vogel et al. |
| 5,831,663 A | 11/1998 | Waterhouse et al. | 6,151,634 A | 11/2000 | Glaser |
| 5,832,024 A | 11/1998 | Schotz et al. | 6,154,207 A | 11/2000 | Farris et al. |
| 5,832,287 A | 11/1998 | Atalla | 6,157,935 A | 12/2000 | Tran et al. |

| | | | | | | |
|---|---|---|---|---|---|---|
| 6,161,059 A | 12/2000 | Tedesco et al. | | 6,654,801 B2 | 11/2003 | Mann et al. |
| 6,170,060 B1 | 1/2001 | Mott et al. | | 6,658,090 B1 | 12/2003 | Harjunen et al. |
| 6,173,172 B1 | 1/2001 | Masuda et al. | | 6,662,231 B1 | 12/2003 | Drosset et al. |
| 6,175,861 B1 | 1/2001 | Williams, Jr. et al. | | 6,702,585 B2 | 3/2004 | Okamoto |
| 6,182,126 B1 | 1/2001 | Nathan et al. | | 6,728,956 B2 | 4/2004 | Ono |
| 6,185,184 B1 | 2/2001 | Mattaway et al. | | 6,728,966 B1 | 4/2004 | Arsenault et al. |
| 6,185,619 B1 | 2/2001 | Joffe et al. | | 6,744,882 B1 | 6/2004 | Gupta et al. |
| 6,191,780 B1 | 2/2001 | Martin et al. | | 6,751,794 B1 | 6/2004 | McCaleb et al. |
| 6,192,340 B1 | 2/2001 | Abecassis | | 6,755,744 B1 | 6/2004 | Nathan et al. |
| 6,198,408 B1 | 3/2001 | Cohen | | 6,789,215 B1 | 9/2004 | Rupp et al. |
| 6,202,060 B1 | 3/2001 | Tran | | 6,816,578 B1 | 11/2004 | Kredo et al. |
| 6,209,060 B1 | 3/2001 | Machida | | 6,898,161 B1 | 5/2005 | Nathan |
| 6,212,138 B1 | 4/2001 | Kalis et al. | | 6,904,592 B1 | 6/2005 | Johnson |
| 6,216,227 B1 | 4/2001 | Goldstein et al. | | 6,928,653 B1 | 8/2005 | Ellis et al. |
| 6,219,692 B1 | 4/2001 | Stiles | | 6,942,574 B1 | 9/2005 | LeMay et al. |
| 6,223,209 B1 | 4/2001 | Watson | | 6,974,076 B1 | 12/2005 | Siegel |
| 6,240,550 B1 | 5/2001 | Nathan et al. | | 7,024,485 B2 | 4/2006 | Dunning et al. |
| 6,243,725 B1 | 6/2001 | Hempleman et al. | | 7,107,109 B1 | 9/2006 | Nathan et al. |
| 6,247,022 B1 | 6/2001 | Yankowski | | 7,124,194 B2 | 10/2006 | Nathan et al. |
| 6,256,773 B1 | 7/2001 | Bowman-Amuah | | 7,188,352 B2 | 3/2007 | Nathan et al. |
| 6,262,569 B1 | 7/2001 | Carr et al. | | 7,195,157 B2 | 3/2007 | Swartz et al. |
| 6,280,327 B1 | 8/2001 | Leifer et al. | | 7,198,571 B2 | 4/2007 | LeMay et al. |
| 6,288,991 B1 | 9/2001 | Kajiyama et al. | | 7,206,417 B2 | 4/2007 | Nathan |
| 6,289,382 B1 | 9/2001 | Bowman-Amuah | | 7,210,141 B1 | 4/2007 | Nathan et al. |
| 6,292,443 B1 | 9/2001 | Awazu et al. | | 7,231,656 B1 | 6/2007 | Nathan |
| 6,298,373 B1 | 10/2001 | Burns et al. | | 7,237,198 B1 | 6/2007 | Chaney |
| 6,302,793 B1 | 10/2001 | Fertitta et al. | | 7,293,277 B1 | 11/2007 | Nathan |
| 6,308,204 B1 | 10/2001 | Nathan et al. | | 7,356,831 B2 | 4/2008 | Nathan |
| 6,311,214 B1 | 10/2001 | Rhoads | | 7,406,529 B2 | 7/2008 | Reed |
| 6,315,572 B1 | 11/2001 | Owens et al. | | 7,424,731 B1 | 9/2008 | Nathan et al. |
| 6,323,911 B1 | 11/2001 | Schein et al. | | 7,448,057 B1 | 11/2008 | Nathan |
| 6,332,025 B2 | 12/2001 | Takahashi et al. | | 7,483,958 B1 | 1/2009 | Elabbady et al. |
| 6,336,219 B1 | 1/2002 | Nathan | | 7,500,192 B2 | 3/2009 | Mastronardi |
| 6,341,166 B1 | 1/2002 | Basel | | 7,512,632 B2 | 3/2009 | Mastronardi et al. |
| 6,344,862 B1 | 2/2002 | Williams et al. | | 7,519,442 B2 | 4/2009 | Nathan et al. |
| 6,346,951 B1 | 2/2002 | Mastronardi | | 7,549,919 B1 | 6/2009 | Nathan et al. |
| 6,356,971 B1 | 3/2002 | Katz et al. | | 7,574,727 B2 | 8/2009 | Nathan et al. |
| 6,359,661 B1 | 3/2002 | Nickum | | 7,647,613 B2 | 1/2010 | Drakoulis et al. |
| 6,370,580 B2 | 4/2002 | Kriegsman | | 7,749,083 B2 | 7/2010 | Nathan et al. |
| 6,381,575 B1 | 4/2002 | Martin et al. | | 7,757,264 B2 | 7/2010 | Nathan |
| 6,384,737 B1 | 5/2002 | Hsu et al. | | 7,783,774 B2 | 8/2010 | Nathan et al. |
| 6,393,584 B1 | 5/2002 | McLaren et al. | | 7,793,331 B2 | 9/2010 | Nathan et al. |
| 6,396,480 B1 | 5/2002 | Schindler et al. | | 2001/0016815 A1 | 8/2001 | Takahashi et al. |
| 6,397,189 B1 | 5/2002 | Martin et al. | | 2001/0023403 A1 | 9/2001 | Martin et al. |
| 6,407,987 B1 | 6/2002 | Abraham | | 2001/0030660 A1 | 10/2001 | Zainoulline |
| 6,408,435 B1 | 6/2002 | Sato | | 2001/0037367 A1 | 11/2001 | Iyer |
| 6,408,437 B1 | 6/2002 | Hendricks et al. | | 2001/0044725 A1 | 11/2001 | Matsuda et al. |
| 6,421,651 B1 | 7/2002 | Tedesco et al. | | 2002/0002079 A1 | 1/2002 | Martin et al. |
| 6,425,125 B1 | 7/2002 | Fries et al. | | 2002/0002483 A1 | 1/2002 | Siegel et al. |
| 6,430,537 B1 | 8/2002 | Tedesco et al. | | 2002/0113824 A1 | 8/2002 | Myers |
| 6,430,738 B1 | 8/2002 | Gross et al. | | 2002/0116476 A1 | 8/2002 | Eyal et al. |
| 6,434,678 B1 | 8/2002 | Menzel | | 2002/0118949 A1 | 8/2002 | Jones et al. |
| 6,438,450 B1 | 8/2002 | DiLorenzo | | 2002/0120925 A1 | 8/2002 | Logan |
| 6,442,549 B1 | 8/2002 | Schneider | | 2002/0129036 A1 | 9/2002 | Ho Yuen Lok et al. |
| 6,448,130 B1 | 9/2002 | Kim | | 2002/0162104 A1 | 10/2002 | Raike et al. |
| 6,449,688 B1 | 9/2002 | Peters et al. | | 2003/0005099 A1 | 1/2003 | Sven et al. |
| 6,470,496 B1 | 10/2002 | Kato et al. | | 2003/0008703 A1 | 1/2003 | Gauselmann |
| 6,488,508 B2 | 12/2002 | Okamoto | | 2003/0018740 A1 | 1/2003 | Sonoda et al. |
| 6,490,570 B1 | 12/2002 | Numaoka | | 2003/0031096 A1 | 2/2003 | Nathan et al. |
| 6,496,927 B1 | 12/2002 | McGrane et al. | | 2003/0041093 A1 | 2/2003 | Yamane et al. |
| 6,498,855 B1 | 12/2002 | Kokkosoulis et al. | | 2003/0065639 A1 | 4/2003 | Fiennes et al. |
| 6,522,707 B1 | 2/2003 | Brandstetter et al. | | 2003/0088538 A1 | 5/2003 | Ballard |
| 6,535,911 B1 | 3/2003 | Miller et al. | | 2003/0093790 A1 | 5/2003 | Logan et al. |
| 6,538,558 B2 | 3/2003 | Sakazume et al. | | 2003/0101450 A1 | 5/2003 | Davidsson et al. |
| 6,543,052 B1 | 4/2003 | Ogasawara | | 2003/0104865 A1 | 6/2003 | Itkis et al. |
| 6,544,122 B2 | 4/2003 | Araki et al. | | 2003/0108164 A1 | 6/2003 | Laurin et al. |
| 6,549,719 B2 | 4/2003 | Mankovitz | | 2003/0135424 A1 | 7/2003 | Davis et al. |
| 6,570,507 B1 | 5/2003 | Lee et al. | | 2003/0208586 A1 | 11/2003 | Mastronardi et al. |
| 6,571,282 B1 | 5/2003 | Bowman-Amuah | | 2003/0225834 A1 | 12/2003 | Lee et al. |
| 6,577,735 B1 | 6/2003 | Bharat | | 2004/0025185 A1 | 2/2004 | Goci et al. |
| 6,578,051 B1 | 6/2003 | Mastronardi et al. | | 2004/0085334 A1 | 5/2004 | Reaney |
| 6,587,403 B1 | 7/2003 | Keller et al. | | 2004/0103150 A1 | 5/2004 | Ogdon et al. |
| 6,590,838 B1 | 7/2003 | Gerlings et al. | | 2004/0204220 A1 | 10/2004 | Fried et al. |
| 6,598,230 B1 | 7/2003 | Ballhorn | | 2004/0220926 A1 | 11/2004 | Lamkin et al. |
| 6,622,307 B1 | 9/2003 | Ho | | 2005/0060405 A1 | 3/2005 | Nathan et al. |
| 6,628,939 B2 | 9/2003 | Paulsen | | 2005/0073782 A1 | 4/2005 | Nathan |
| 6,629,318 B1 | 9/2003 | Radha et al. | | 2005/0086172 A1 | 4/2005 | Stefik |
| 6,643,620 B1 | 11/2003 | Contolini et al. | | 2005/0125833 A1 | 6/2005 | Nathan et al. |
| 6,643,690 B2 | 11/2003 | Duursma et al. | | 2005/0267819 A1 | 12/2005 | Kaplan |

| | | | |
|---|---|---|---|
| 2006/0018208 A1 | 1/2006 | Nathan et al. |
| 2006/0035707 A1 | 2/2006 | Nguyen et al. |
| 2006/0062094 A1 | 3/2006 | Nathan et al. |
| 2006/0239131 A1 | 10/2006 | Nathan et al. |
| 2006/0293773 A1 | 12/2006 | Nathan et al. |
| 2007/0121430 A1 | 5/2007 | Nathan |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0247979 A1 | 10/2007 | Brillon et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0239887 A1 | 10/2008 | Tooker et al. |
| 2009/0037969 A1 | 2/2009 | Nathan et al. |
| 2009/0070341 A1 | 3/2009 | Mastronardi et al. |
| 2009/0138111 A1 | 5/2009 | Mastronardi |
| 2009/0265734 A1 | 10/2009 | Dion et al. |
| 2009/0282491 A1 | 11/2009 | Nathan |
| 2010/0042505 A1 | 2/2010 | Straus |
| 2010/0211818 A1 | 8/2010 | Nathan et al. |

FOREIGN PATENT DOCUMENTS

| | | |
|---|---|---|
| DE | 3406058 | 8/1985 |
| DE | 3723737 A1 | 1/1988 |
| DE | 3820835 A1 | 1/1989 |
| DE | A 3820835 | 1/1989 |
| DE | 3815071 | 11/1989 |
| DE | 4244198 | 6/1994 |
| DE | 196 10 739 | 9/1997 |
| DE | 19904007 | 8/2000 |
| EP | A 0082077 | 6/1983 |
| EP | 0140593 A2 | 5/1985 |
| EP | 0 256 921 | 2/1988 |
| EP | 0283304 | 9/1988 |
| EP | A 0283350 | 9/1988 |
| EP | A 0313359 | 4/1989 |
| EP | O0340787 | 11/1989 |
| EP | 0363186 | 4/1990 |
| EP | 0 425 168 A | 5/1991 |
| EP | 0464562 A2 | 1/1992 |
| EP | 0480558 | 4/1992 |
| EP | 0498130 | 8/1992 |
| EP | 0498130 A2 | 8/1992 |
| EP | 0 507 110 | 10/1992 |
| EP | 0529834 | 3/1993 |
| EP | 0538319 B1 | 4/1993 |
| EP | A 0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974 896 A1 | 1/2000 |
| EP | 0974941 | 1/2000 |
| EP | 0982695 | 3/2000 |
| EP | 1001391 | 5/2000 |
| EP | 1408427 | 4/2004 |
| EU | 0309298 | 3/1989 |
| FR | A 2602352 | 2/1988 |
| FR | 2808906 | 11/2001 |
| GB | A 2122799 | 1/1984 |
| GB | 2166328 A | 4/1986 |
| GB | 2170943 | 8/1986 |
| GB | 2193420 | 2/1988 |
| GB | 2 238 680 A | 6/1991 |
| GB | 2254469 | 10/1992 |
| GB | 2259398 | 3/1993 |
| GB | 2262170 A | 6/1993 |
| GB | 2380377 | 4/2003 |
| JP | 57-173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 07281682 | 10/1995 |
| JP | 08-279235 | 10/1996 |
| JP | 8274812 | 10/1996 |
| JP | 10-098344 | 4/1998 |
| WO | WO 86 01326 A | 2/1986 |
| WO | WO A 90 07843 | 7/1990 |
| WO | WO 91/08542 | 6/1991 |
| WO | WO A 91 20082 | 12/1991 |
| WO | WO 93/16557 | 8/1993 |
| WO | WO A 93 18465 | 9/1993 |
| WO | WO A 94 03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96 12258 A | 4/1996 |
| WO | WO 98/07940 | 2/1998 |
| WO | WO 98/45835 | 10/1998 |
| WO | WO 01/00290 | 1/2001 |
| WO | WO 01/08148 | 2/2001 |
| WO | WO 02/095752 | 11/2002 |
| WO | WO 2006/014739 | 2/2006 |

OTHER PUBLICATIONS

"High-Speed Opens and Shorts Substrate Tester", *IBM Technical Disclosure Bulletin*, vol. 33, No. 12, May 1991, pp. 251-259.
Patent Abstract of Japan vol. 95, No. 010 & JP 07 281682 A (Naguo Yuasa), 27 Oct. 1 JP 07 281682, figure 1-6 abrége.
Bonczck, Robert H. et al, "The DSS Development System", 1983 National Computer Conference, Anaheim, California, May 16-19, 1983, pp. 441-455.
IBM Technical Disclosure Bulletin, vol. 30, No. 5, Oct. 1987, "Method for Automated Assembly of Software Versions", pp. 353-355.
"Robotic Wafer Handling System for Class 10 Environments"IBM Technical Disclosure Bulletin, vol. 32, No. 9A, Feb. 1990, pp. 141-143.
"Darts Revolution Again", Replay Magazine, Mar. 1991, pp. 146-148.
Galen A. Grimes, "Chapter 18, Taking Advantage or Web-based Audio.".
Petri Koskelainem "Report on Streamworks ™".
W. Richard Stevens, "TCP/IP Illustrated: vol. 1, the Protocols".
Nowell Outlaw "Virtual Servers Offer Performance benefits for Networks Imaging".
"Ecast Forges Landmark International Technology Partnership", Business Wire at www.findarticles.com/cf_0/m0EIN/2000_July_25/63663604/print.jhtml, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
Derfler et al., "How Networks Work", Millennium Ed., Que Corporation, Jan. 2000.
European Search Report from EP 1 993 079.
European Search Report issued for European Application No. 08000845.1-1238/1962251, dated Apr. 3, 2009.
Gralla, "How the Internet Works", Millennium Ed., Que Corporation, Aug. 1999.
Hicks et al., "Dynamic software updating", ACM PLDI, pp. 13-23, 2001.
iTOUCH 27 New Games brochure, JVL Corporation, 2005, 2 pages.

iTouch 8 Plus brochure, JVL Corporation, 2005, 2 pages.
Kozierok, The PC Guide, Site Version 2.2.0, http://www.pcguide.com, Apr. 17, 2001.
Liang et al., "Dynamic class loading in the Java virtual machine", ACM OOPSLA, pp. 36-44, 1998.
Look and iTouch brochure, JVL Corporation, 2004, 2 pages.
Megatouch Champ brochure, Merit Industries, Inc., 2005, 2 pages.
Melnik et al., "A mediation infrastructure for digital library services", ACM DL, pp. 123-132, 2000.
Mod Box Internet brochure, Merit Entertainment, 2006, 2 pages.
Newsome et al., "Proxy compilation of dynamically loaded Java classes with MoJo", ACM LCTES, pp. 204-212, 2002.
Schneier, "Applied Cryptography", Second Edition, John Wiley & Sons, Inc. New York, 1996.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999.

* cited by examiner

SOUND CONTROL CIRCUIT FOR A DIGITAL AUDIOVISUAL REPRODUCTION SYSTEM

CROSS-REFERENCES TO RELATED APPLICATIONS

This application is a continuation of application Ser. No. 09/357,758, filed Jul. 21, 1999 now U.S. Pat. No. 6,898,161, the entire content of which is hereby incorporated by reference in this application.

FIELD OF THE INVENTION

This invention relates to a sound control circuit for a digital audiovisual reproduction system.

BACKGROUND OF THE INVENTION

Sound control circuits making use of a game port to connect a joystick are known in prior art.

Prior art also includes systems in which a sound phenomenon occurs in loudspeakers when the sound control circuit is activated, at the time that a central unit equipped with a sound control circuit connected to sound reproduction means is initialized. This sound phenomenon usually results in a "pop" that can be heard in the loudspeakers.

OBJECT AND SUMMARY OF THE INVENTION

Therefore, the purpose of this invention is to overcome the disadvantages of prior art by proposing a sound control circuit providing access to the configuration of an audiovisual reproduction system in order to create additional functions for a smart digital audiovisual reproduction system.

This purpose is achieved by the fact that the sound control circuit is installed on a digital audiovisual reproduction system wherein the game port in the sound control circuit is used to create an access to the configuration of the reproduction system and/or additional management functions for the audiovisual reproduction system.

According to another feature, a first pin on the game port is grounded through a first switch, to create a temperature alarm for the audiovisual reproduction system.

According to another feature, a second pin on the game port is grounded through a second switch to increase the volume.

According to another feature, a third pin on the game port is grounded through a third switch to reduce the volume.

According to another feature, a fourth pin on the game port is grounded through a fourth switch when a microphone is activated, in order to obtain a function to increase the microphone volume and reduce the volume of other audio sources.

According to another feature, the first, second, third and fourth pins on the game port are grounded through a fifth switch for a short period to obtain access to system configuration modification functions.

According to another feature, the first, second, third and fourth pins on the game port are grounded through a first switch for a long period to cancel the musical selection being played, and other selections that are in the queue.

Another purpose of the invention is to propose a sound control circuit that inhibits sound production in loudspeakers for the time necessary to initialize the audiovisual reproduction system in order to prevent any sound phenomena.

This purpose is achieved due to the fact that the operating system sends an order through the sound control circuit to open an electric circuit, in order to switch the audiovisual reproduction system amplifier off during the period in which the audiovisual reproduction system is initialized, and sends an order to close the same circuit after the initialization has finished, to switch the amplifier on.

Another purpose of the invention is to provide security of information specific to the audiovisual reproduction system, through the sound control circuit.

This purpose is achieved by the fact that one input to the sound control circuit is connected to an integrated circuit comprising a non-volatile memory that the operating system uses through the sound control circuit to read or store information in the integrated circuit memory.

According to another feature, the information stored in the integrated circuit memory is only accessible after the user has-been authenticated by entering a code.

BRIEF DESCRIPTION OF THE DRAWINGS

Other features and advantages of this invention will become clearer after reading the following description with reference to the attached drawings, in which.

DESCRIPTION OF PREFERRED EMBODIMENTS

Figure 1:
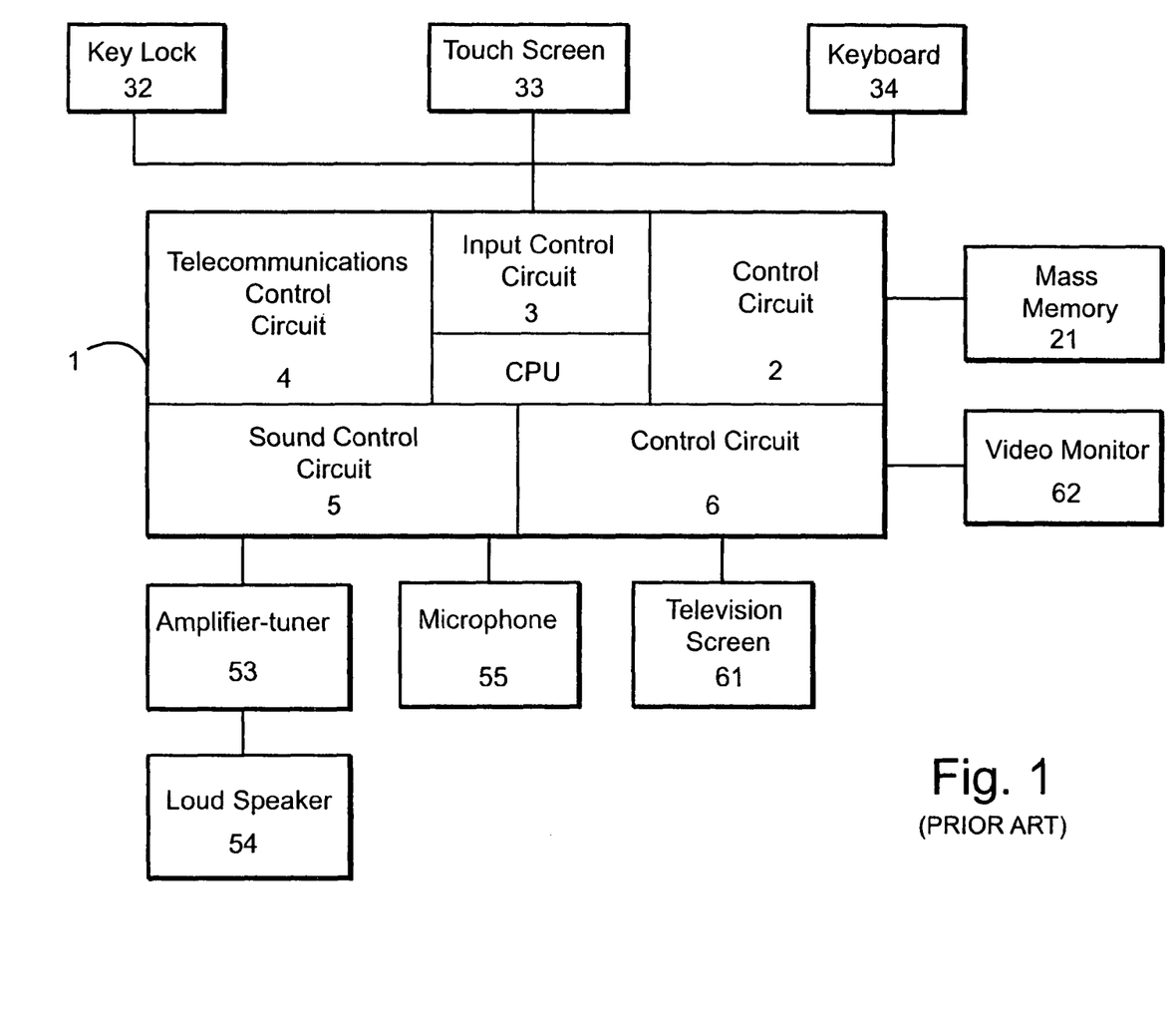
FIG. 1 shows an electrical diagram for a digital audiovisual reproduction system according to prior art.

FIG. 1 shows an electrical diagram of a digital audiovisual reproduction system according to prior art. This audiovisual reproduction system, also called a juke-box, was described in international patent application PCT/FR94/01185 deposited by the applicant. This system comprises particularly a central unit (1) that controls and manages a sound control circuit (5), a telecommunications control circuit (4), an input control circuit (3), a control circuit (2) for a mass memory (21), a control circuit (6) for a display means. The display means comprise mainly an SVGA type high resolution, low radiation, flat screen video monitor (62) without interlacing. This monitor is used for reproduction of images (for example album covers of musical selections), or graphics or video clips.

For reproduction of sound information for musical selections, the system comprises loudspeakers (54) that receive the signal from an amplifier-tuner (53) connected to the music synthesizer type of sound control circuit (5) designed to support a large number of input sources, while providing a CD (Compact Disk) type quality, for example such as a "Sound Blaster" multimedia audio adapter card for use with a microprocessor. The system may also include other audio sources for sound reproduction.

The audiovisual reproduction system manages a touch screen (33) through its input controller circuit (3), which includes a glass coating panel using the "advanced surface wave technology" and an AT type bus controller. Various items of information are displayed on the video monitor (62) or a television screen (61), and customers can use this touch screen to select one of these items of information, or the manager or the owner of the system can use it for management command and control information. The touch screen was also used for maintenance purposes in combination with an external keyboard (34) that could be connected to the system that was already fitted with a keyboard connector, controlled by a key lock (32) through the interface circuit. The system is housed in a steel frame.

Apart from these elements, a cordless microphone (55) is connected to the sound controller (5), which can transform this sound controller into a powerful public address and information system, or possibly a karaoke machine.

The system operating software is built up around a library of tools and services specifically oriented towards audiovisual applications in a multimedia universe. This library includes a high performance multitask operating system that efficiently enables simultaneous execution of multiple code fragments. This operating system thus enables concurrent execution of operations carried out on the display means, sound reproduction means and the management of telecommunications links through the distribution network, in an orderly manner while avoiding any conflicts. This operating system is also very flexible. This system prevents access to system configuration, for example to adjust the volume; in any way other than by using a keyboard and a keyboard connector controlled by a key lock.

Figure 2:
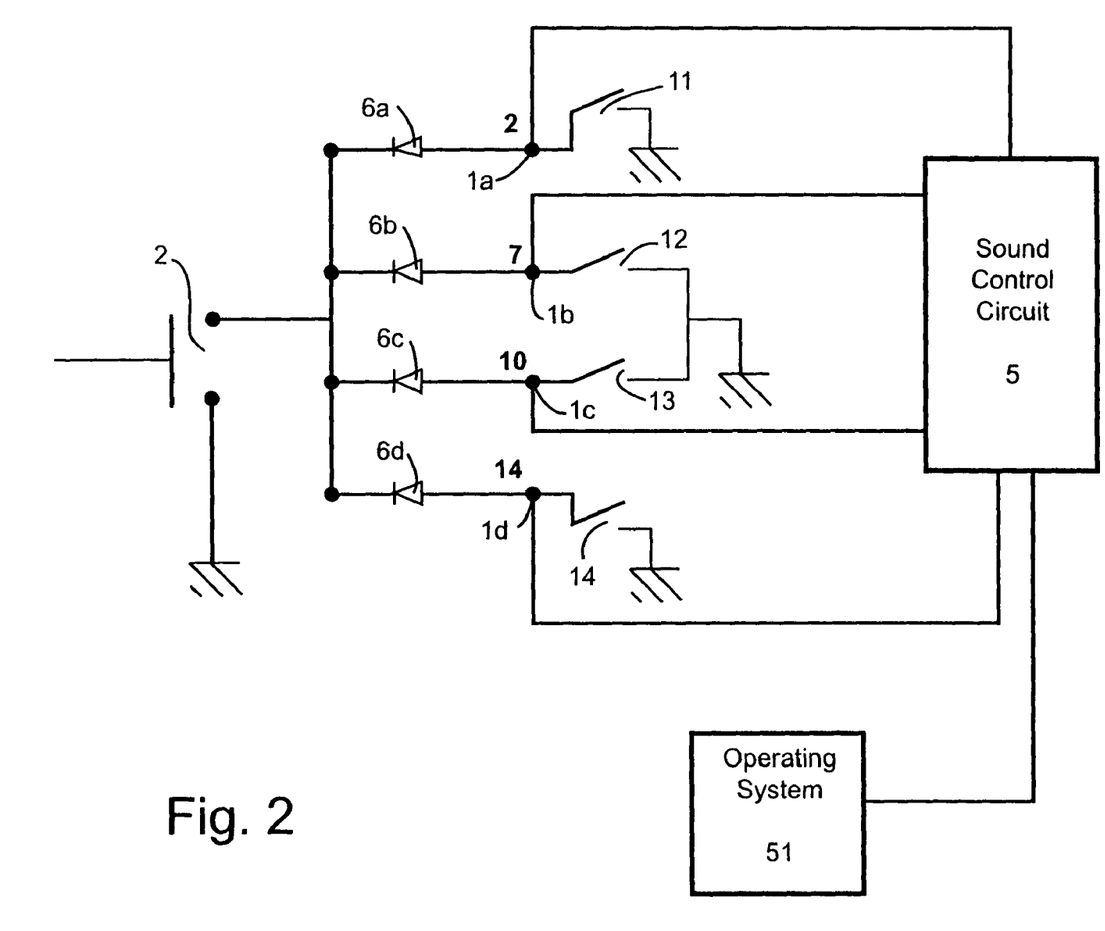
FIG. 2 shows an electrical diagram of a game port of the sound control circuit according to the invention.

FIG. 2 shows an electrical diagram of the game port of the sound control circuit according to the invention. Four pins (1a, 1b, 1c, 1d) on the game port of the sound control circuit (5) are each connected firstly to a terminal of a corresponding switch (11, 12, 13, 14), the other terminal of the switch being grounded to put the corresponding pin in the game port into contact with the ground when the corresponding switch (11, 12, 13, 14) is in the closed position, and secondly to the cathode of a corresponding diode (6a, 6b, 6c, 6d). The anodes of the corresponding diodes (6a, 6b, 6c, 6d) are connected to a common point connected to the same input to a fifth switch (2), in which the other input is grounded so that when this switch is in the closed position, it simultaneously grounds the four pins. Advantageously, pins (1a, 1b, 1c, 1d) on the game port used for the circuit according to the invention are pins No. 2, 7, 10 and 14. Thus, this circuit makes it possible to manage additional functions for an audiovisual reproduction system. A first switch (11) connected to pin No. 2 manages a system temperature alarm function. By controlling the first switch (11) through a temperature detection device, it is possible to close the first switch (11) when a determined temperature threshold is exceeded. For example, the first switch (11) closed information is interpreted by the sound control circuit (5) and by the operating system (51) of the audiovisual reproduction system to send an alarm request to the central server. A second switch (12) connected to pin No. 7 is used to increase the volume. This can be done for example by putting a control button on the frame of the audiovisual reproduction system such that pressing the button will close the contact of the second switch (12). The result of closing the second switch (12) is that the sound control circuit (5) sends a signal used by the operating system software (51) to increase the sound volume and to memorize this new reference value. A third switch (13) connected to pin No. 10 reduces the volume in exactly the same way. A fourth switch (14) is connected to pin No. 14 to manage use of the microphone (55, FIG. 1). The microphone (55, FIG. 1) preferably used with the audiovisual reproduction system is a microphone (55, FIG. 1) with a control switch. The user presses this switch when he wants to use the microphone (55, FIG. 1). Using the microphone (55, FIG. 1) reduces the sound volume of the musical selection currently being played, which may continue in the background, and increases the sound volume of the microphone (55, FIG. 1). Using the microphone (55, FIG. 1) also reduces the volume of the other audio sources. The fourth switch (14) also performs this operation automatically whenever the user presses the switch on the microphone (55, FIG. 1) to speak. In fact, all that is necessary is to connect the fourth switch (14) to the switch on the microphone (55, FIG. 1) such that when the user presses the microphone switch (55, FIG. 1), the fourth switch (14) closes and remains closed as long as the microphone switch (55, FIG. 1) is pressed. When the fourth switch (14) is closed, the sound control circuit (5) produces a signal used by the operating system software (51) to reduce the amplification of the signal output from the musical selection currently being played and to increase the signal from the microphone (55, FIG. 1). The fifth switch (2) is used to ground the four pins (1a, 1b, 1c, 1d) simultaneously to perform two different functions depending on the time during which a user keeps the fifth switch (2) closed. Advantageously, the fifth switch (2) is connected to a control button installed on the frame of the audiovisual reproduction system so that pressing the button closes the fifth switch (2). When the button is kept pressed for a short period, closing the fifth switch (2) triggers a counter. If the fifth switch (2) is closed before the countdown has finished, the sound control system (5) and the operating system (51) will trigger a management mode, in which in particular the configuration of the audiovisual reproduction system can be modified. For example, this management mode is described in French patent application 9401185. When the button is kept pressed for a longer period, the countdown can be completed and the fifth switch (2) is closed at the end of the countdown with the result that the sound control circuit (5) and the operating system (51) send a command to cancel the musical selection currently being played and selections waiting to be played. Musical selections waiting to be played are memorized in a file or queue created by the operating system. Triggering the cancel command will delete or initialize this file so that there are no musical selections waiting to be played. Advantageously, a special tool is necessary to access increase and reduce volume buttons and management mode, or the buttons may be located in a locked area inside the frame of the audiovisual reproduction system.

Figure 3:
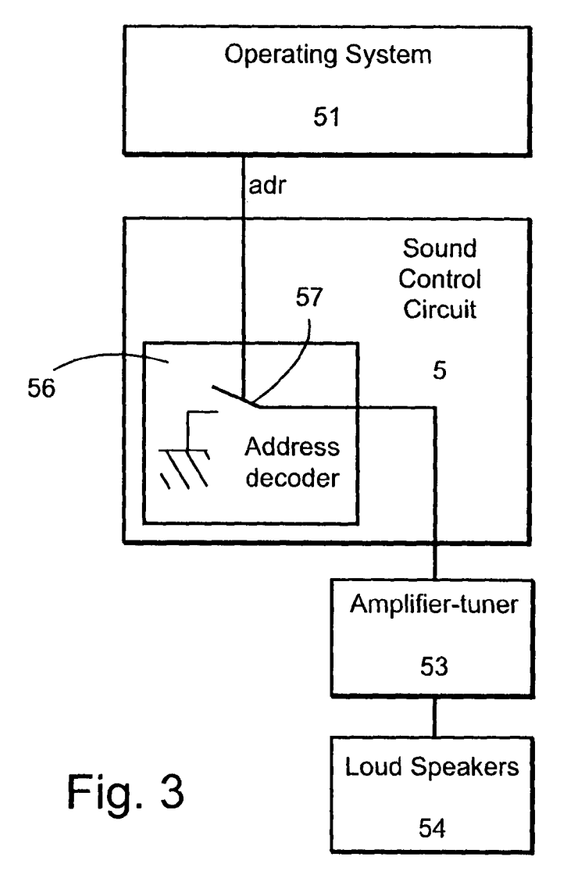
FIG. 3 shows a detail of the electrical diagram between the sound control circuit according to the invention and sound reproduction means.

Another feature of the sound control circuit (5) according to the invention is that it prevents the occurrence of sound phenomena when the sound control circuit (5) is being activated during initialization of the operating system of the audiovisual reproduction system. Consequently, during the initialization phase of the audiovisual reproduction system, the operating system (51) sends an order on the address bus of the sound control circuit (5) to a given address to cutoff the power supply to the amplifier in the sound control circuit (5), through a switch (57). Switching off the amplifier by closing an electronic switch (57) controlled by an address decoder circuit (56) prevents sound production in the loudspeakers. At the end of the initialization phase, the operating system (51) sends another data address signal through the sound control circuit (5), which is decoded by the circuit (56) triggering opening of the electronic switch (57) to put the amplifier into normal service without creating any sound phenomena in the loudspeakers since the sound control circuit (5) has already been activated.

Another feature of the sound control circuit (5) according to the invention is that one of its inputs is connected to an integrated circuit. A sound control circuit (5) with two inputs is known in prior art. The integrated circuit is also known in prior art. Electrically power is only applied to this circuit when an operation is carried out, and it is capable of storing serial information in a non-volatile memory. Thus, the operating system can read or write information on the circuit, through the sound control circuit according to the invention. Advantageously, the integrated circuit is fixed to the frame of the audiovisual reproduction system and contains information particularly about the serial number of the audiovisual system and basic information about the configuration of the audiovisual reproduction system such as the sound volume, the number of credits, the version of the operating system, etc. Advantageously, information stored in the memory of the integrated circuit is only accessible after the user has been authenticated by inputting a code.

It is obvious that other modifications that can be made by an expert in the subject are within the framework of the invention.

The invention claimed is:

1. A sound control circuit connected to an amplifier-tuner and configured to support a plurality of input sources, installed on an audiovisual reproduction system managed by an operating system,
wherein the operating system is configured to automatically send an order on an address bus of the sound control circuit to enable an electric circuit, in order to switch an amplifier of the audiovisual reproduction system off during a period in which the audiovisual reproduction system is initialized, and to send an order to disable the electric circuit after the initialization has finished to switch the amplifier on only after initialization has finished.

2. The sound control circuit of claim 1, wherein one input port to the sound control circuit is connected to an integrated circuit comprising a non-volatile memory that the operating system uses through the sound control circuit to read or store information in the integrated circuit memory.

3. The sound control circuit according to claim 2, wherein the information stored in the integrated circuit memory is only accessible after the user has been authenticated by entering a code.

4. The sound control circuit according to claim 1, wherein the sound control circuit constitutes different hardware than does an input control circuit connected to the audiovisual reproduction system.

5. A sound control circuit according to claim 4, wherein both the sound control circuit and the input control circuit are configured (1) to access the configuration of the audiovisual reproduction system, and (2) to manage the audiovisual reproduction system, via respective peripherals connected to ports thereof.

6. The sound control circuit according to claim 1, further comprising a game port configured to manage any two or more of sound signals provided by microphone input to the audiovisual reproduction system, transmission of sound signals to loudspeakers from the audiovisual reproduction system, and songs stored in a mass storage location of the audiovisual reproduction system.

7. The sound control circuit according to claim 1, further comprising a game port installed on the digital audiovisual reproduction system
wherein the game port is part of the sound control circuit, and the game port comprises pin connectors that are connected to electric switches arranged to enable access to configuration of the audiovisual reproduction system, and to manage the audiovisual reproduction system, said electrical switches being part of the digital audiovisual reproduction system.

8. A sound control circuit according to claim 7, wherein a first pin on the game port is grounded through a first switch to provide a temperature alarm function for the audiovisual reproduction system.

9. A sound control circuit according to claim 8, wherein a second pin on the game port is grounded through a second switch to increase volume.

10. A sound control circuit according to claim 9, wherein a third pin on the game port is grounded through a third switch to reduce the volume.

11. A sound control circuit according to claim 10, wherein a fourth pin on the game port is grounded through a fourth switch when a microphone is activated, to increase the microphone volume and reduce the volume of other audio sources that are managed by the audiovisual reproduction system.

12. A sound control circuit according to claim 7, wherein a first, second, third and fourth pins on the game port are grounded through a fifth switch for a short period to obtain access to system configuration modification functions.

13. A sound control circuit according to claim 7, wherein a first, second, third and fourth pins on the game port are grounded through a fifth switch for a long period to cancel a musical selection being played, and other musical selections that are in a queue of songs to be played residing in a memory of the audiovisual reproduction system.

14. An audiovisual reproduction system managed by an operating system, a sound control circuit being connected to an amplifier-tuner, configured to support a plurality of input sources, and installed on the audiovisual reproduction system,
wherein the operating system is configured to automatically send an order on an address bus of the sound control circuit to enable an electric circuit, in order to switch an amplifier of the audiovisual reproduction system off during a period in which the audiovisual reproduction system is initialized, and to send an order to disable the electric circuit after the initialization has finished to switch the amplifier on only after initialization has finished.

15. The audiovisual reproduction system according to claim 14, wherein one input port to the sound control circuit is connected to an integrated circuit comprising a non-volatile memory that the operating system uses through the sound control circuit to read or store information in the integrated circuit memory.

16. The audiovisual reproduction system according to claim 15, wherein the information stored in the integrated circuit memory is only accessible after the user has been authenticated by entering a code.

17. The audiovisual reproduction system according to claim 14, wherein the sound control circuit constitutes different hardware than does an input control circuit connected to the audiovisual reproduction system.

18. The audiovisual reproduction system according to claim 17, wherein both the sound control circuit and the input control circuit are configured (1) to access the configuration of the audiovisual reproduction system, and (2) to manage the audiovisual reproduction system, via respective peripherals connected to ports thereof.

19. The audiovisual reproduction system according to claim 14, further comprising a game port configured to manage any two or more of: sound signals provided by microphone input to the audiovisual reproduction system, transmission of sound signals to loudspeakers from the audiovisual reproduction system, and songs stored in a mass storage location of the audiovisual reproduction system.

20. The audiovisual reproduction system according to claim 14, further comprising a game port installed on the digital audiovisual reproduction system,
wherein the game port is part of the sound control circuit, and the game port comprises pin connectors that are connected to electric switches arranged to enable access to configuration of the audiovisual reproduction system, and to manage the audiovisual reproduction system, said electrical switches being part of the digital audiovisual reproduction system.

* * * * *